2 Sheets—Sheet 1.

I. R. LAUX.

INJECTOR.

No. 11,513. Reissued Nov. 19, 1895.

Witnesses
Jos. H. Blackwood
Carrie L. Acker.

Isaac R. Laux Inventor
By Raymond & Arnold under
Attorneys

THE NORRIS PETERS CO., PHOTO-LITHO., WASHINGTON, D. C.

I. R. LAUX.

INJECTOR.

No. 11,513. Reissued Nov. 19, 1895.

Witnesses
Jos. H. Blackwood
Carrie L. Acker.

Isaac R. Laux Inventor
By Raymond & Omohundro
Attorneys

THE NORRIS PETERS CO., PHOTO-LITHO., WASHINGTON, D. C.

UNITED STATES PATENT OFFICE.

ISAAC R. LAUX, OF ORRVILLE, OHIO.

INJECTOR.

SPECIFICATION forming part of Reissued Letters Patent No. 11,513, dated November 19, 1895.

Original No. 543,554, dated July 30, 1895. Application for reissue filed October 22, 1895. Serial No. 566,571.

*To all whom it may concern:*

Be it known that I, ISAAC R. LAUX, a citizen of the United States, residing at Orrville, in the county of Wayne and State of Ohio, have invented a new and useful Injector, of which the following is a specification.

My invention relates to injectors of the class known as "restarting" injectors, which are adapted to start automatically when their function is interrupted temporarily through a stoppage of the water or the steam-supply.

The objects of the invention are to provide for the escape of steam from the chamber of the combining-cone into the overflow-cavity, so as to prevent back-pressure whenever the water supply is interrupted, the means of escape being automatically closed to prevent drawing from the contents of the overflow-cavity when the proper passage of the water and steam through the apparatus is established.

Another object of this invention is to insure a perfect seal between the chamber of the combining-cone and the overflow-cavity, regardless of the necessary play between the cut-off device and its guide, whereby the desirable or even an unnecessary looseness between such members is rendered harmless and the sensitiveness and promptness of the apparatus is greatly promoted.

These and such other objects as may hereinafter appear are attained by the devices illustrated by the accompanying drawings, in which—

Figure 1:
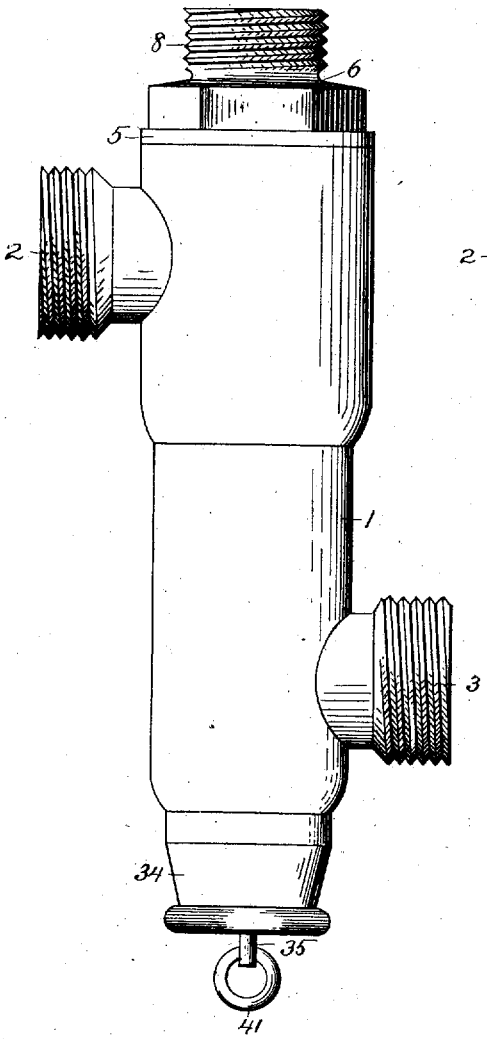
Figure 3:
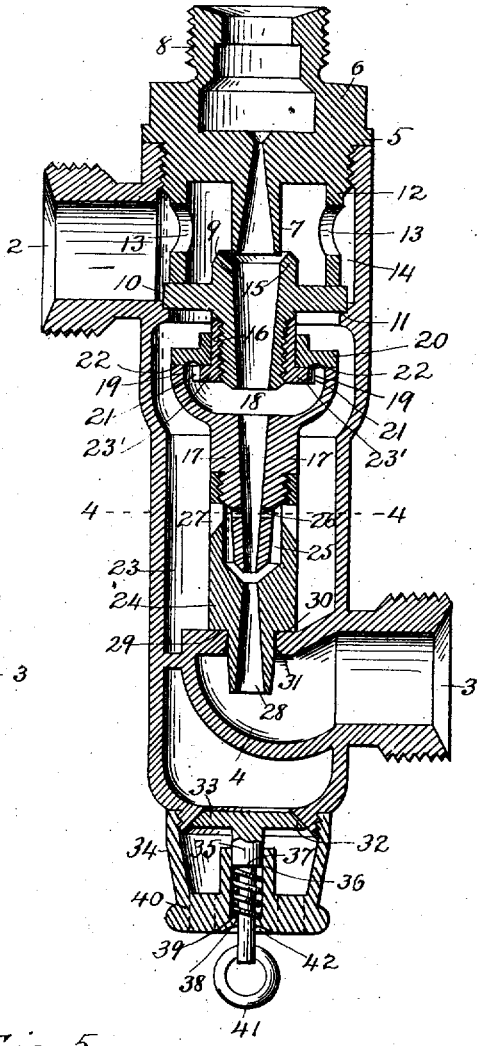
Figure 5:
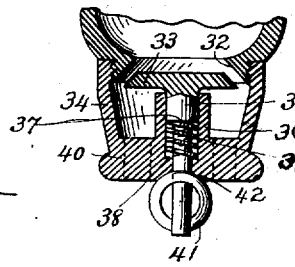
Figure 2:
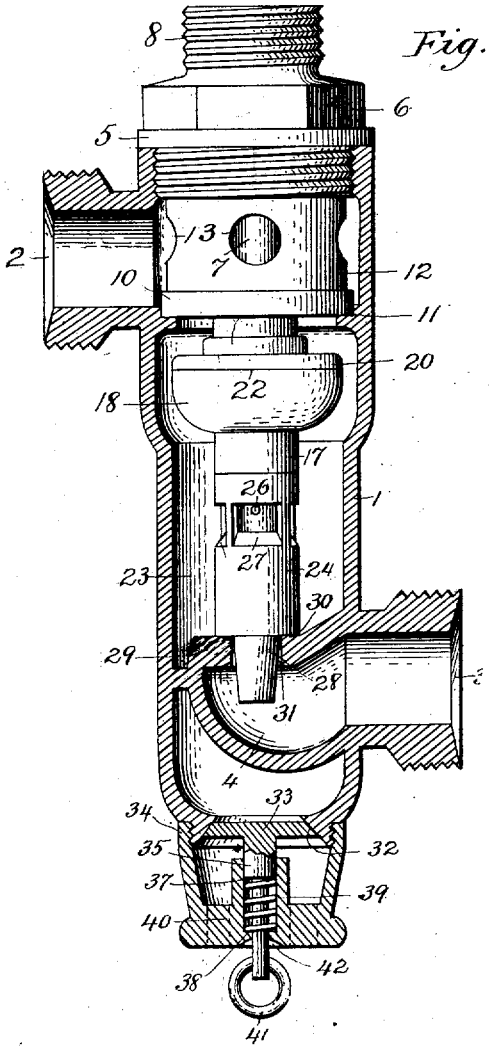
Figure 7:
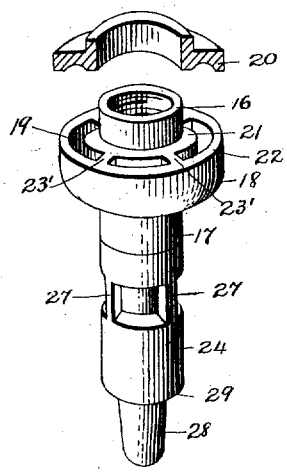
Figure 4:
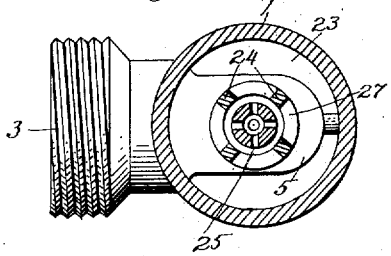
Figure 6:
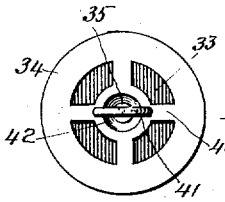

Figure 1 is a side view of an injector embodying my invention. Fig. 2 is a similar view showing the casing in section. Fig. 3 is a central section of the apparatus. Fig. 4 is a horizontal section on the line 4 4 of Fig. 3. Fig. 5 is a partial longitudinal section showing the lower end of the injector and illustrating the manner of locking the overflow-valve in its open position. Fig. 6 is a plan view of the lower end of the injector. Fig. 7 is a perspective view of the "discharge-cone," so called, and of the combining-cone united and a cross-section of the gravity-valve raised above and apart from its seat, so as to clearly disclose the seat and the construction of the valve.

Similar numerals of reference indicate corresponding parts in all the figures of the drawings.

1 designates the casing, which is substantially cylindrical in construction, and is provided near its upper end with a water-inlet port 2 and near its lower end with an outlet-port 3, said outlet-port communicating with an outlet-cavity 4, located within the casing and having no communication therewith, while the water-inlet port 2 is in direct communication with the interior of the casing. Threaded in the upper end of the casing, with its shoulder 5 contiguous to the upper edge thereof, is a cap 6, provided with a reduced nozzle or steam-jet 7, said cap being provided with an exteriorly-threaded reduced portion 8 for attachment to a steam-supply pipe. (Not shown.) The nozzle or jet 7 is enlarged toward its lower or outlet end, which is spaced from while arranged in alignment with the lifting-cone 9, said lifting-cone being arranged in the casing and having a flange 10, which rests upon a seat 11 therein adjacent to the water-inlet port. The cap is provided within the casing with a perforated flange 12 to bear upon the upper surface of the flange of the lifting-cone, the perforations 13 of said flange 12 being in communication with the water-inlet port and the casing being preferably enlarged, as shown at 14, whereby all of said perforations 13 are in communication with the port 2.

The lifting-cone 9 extends at its upper or larger end slightly above the plane of the flange 10 thereon to form an annular lip 15, into which the jet 7 discharges, and the said flange 10 cuts off all communication between the space above and below the same, except as a passage is afforded through the lifting-cone. The combining-cone 17 has an enlarged portion constituting a chamber 18, preferably at its top, and extending above the chamber is a reduced internally-threaded sleeve 16, engaged on the lower extremity of the lifting-cone. The top edge 22 of surrounding walls of the chamber 18 and the top of collar 21 about the bottom of sleeve 16 are in the same plane and constructed to form seats for the annular gravity-valve 20, which is mounted on the sleeve 16, and is adapted to slide freely up and down thereon, as occasion may require. Webs 23′ at intervals connect the top of chamber 18 with the collar 21, and this leaves the top of chamber 18 sufficiently open through passages 19 to serve all practical purposes. The lateral depth of collar 21 is such as to insure a perfectly water-tight seating of valve 20 at this point, and while the operations of the injector require that the valve be comparatively loosely mounted on sleeve 16, so that it may easily and promptly respond to the automatic action of the machine, it is obvious that such mounting may be had with this construction and yet have a perfectly-sealed valve when the valve is down upon its seat, as seen in Fig. 3. When valve 20 is raised and open, the interior of the combining-cone is in communication with the annular overflow-cavity 23.

Threaded at its upper end upon the combining-cone at an intermediate point is the discharging-cone 24, having an enlarged upper cavity 25, into which projects the lower reduced end of the combining-cone, said reduced end of the combining-cone being provided with outlet-perforations 26, which communicate with said cavity 25, and are opposite outlet-openings 27 in the walls of the cavity, said openings 27 communicating with the overflow-cavity 23. The nozzle 28 at the lower end of the discharging-cone is increased in diameter toward its lower end and extends into the outlet-cavity 4, which is in communication with the outlet-port 3, said outlet-port being adapted to be connected by suitable tubing with the boiler. (Not shown.) The discharging-cone is provided with an exteriorly-annular shoulder 29 to rest upon a seat 30, surrounding an opening 31 in the upper wall of the outlet-cavity 4.

In the bottom of the overflow-cavity 23 and below the plane of the outlet-port 3 is a seat 32 for a downwardly-opening valve 33, arranged in the outlet-nozzle 34, which is screwed upon the lower end of the casing. The stem 35 of the overflow-valve is fitted in a tubular guide 36, arranged axially in the nozzle 34, said stem being provided with a shoulder 37 and the guide being provided with a seat 38, between which and within the guide is arranged a coiled spring 39 to normally hold the overflow-valve seated. The lower end of the overflow-nozzle is open, with the exception of the radial webs 40, which support the guide 36, and attached to the lower exposed end of the valve-stem is a swinging ring 41, adapted, as shown in Fig. 5, to be arranged in an upright position and engaged with an annular depression 42 at the lower end of the guide to hold the overflow-valve in its depressed position while the casing is being drained.

It will be understood that in operation the valve which closes the relief-openings 19 in the top of the enlarged chamber of the combining-cone provides for the free escape of steam, which is discharged from the mouth of the lifting-cone, to prevent back-pressure in said lifting-cone before the proper flow of water is established. This free escape of the steam allows the formation of a vacuum by condensation, and thus operates through the water-inlet port to elevate the water from a depressed source. This valve 20 also provides for the escape of surplus water into the overflow-chamber until the proper velocity of movement through the combining-cone is attained, when the valve will close by gravity and exclude any air which may be present in the body of the injector. Said valve prevents the vacuum that is formed by the velocity of the water between the mouth of the lifting-cone and the upper end of the combining-cone from acting upon the contents of the overflow-cavity. Hence when there is an interruption in the water-supply there is no delay in the restarting of the injector.

It should be observed that the lifting, combining, and discharging cones are connected together by screw-joints, the shoulder 29 of the discharging-cone and the flange 10 of the lifting-cone being arranged upon seats within the casing and that the cap is provided with a depending flange 12 to bear upon the flange 10 and thus lock all of the removable parts of the injector in place within the casing. Inasmuch as the said lifting, combining, and discharging cones are secured together independently of the casing their proper alignment is assured and they can be removed from the casing without difficulty and without separation simply by the removal of the retaining-cap.

When the overflow-valve is locked in its open position by means of the swinging ring 41, in order to drain the casing when the injector is not in use, the admission of steam, when it is desired to again use the injector, causes a depression of the overflow-valve, and hence the release of the ring 41, which drops to the position shown in Figs. 1, 2, and 3.

A further advantage of the improved injector resides in the fact that the lifting, combining, and discharging cones are detachably but rigidly connected and are held in place in the casing solely by the removable cap 6, which is threaded in the upper end of the casing, and therefore when it is necessary to clean the parts of the apparatus the interior construction may be removed by disconnecting said cap and thereby releasing the connected cones.

It will be understood that in practice various changes in the form, proportion, and minor details of construction may be resorted to without departing from the spirit or sacrificing any of the advantages of this invention.

Having thus described my invention, I claim—

1. In combination with the lifting cone of an injector, a combining cone having a chamber provided with overflow passages, and an automatically operating valve adapted to seat itself on each side of said overflow passages, substantially as set forth.

2. An injector comprising a lifting cone, a combining cone having a chamber provided with overflow passages disposed about its axis, a valve seat on each side of the overflow passages, and a valve adapted to rest on the valve seats, substantially as shown and described.

3. An injector having in combination a lifting cone, a combining cone having at its top a chamber, provided with an overflow opening disposed about its axis, a valve seat on each side of the overflow opening, and a valve adapted to rest upon said valve seats so as to close said opening, said valve being guided by the exterior of the lower portion of the lifting cone, substantially as set forth.

4. An injector, having in combination, a lifting cone, a combining cone having at its top a chamber provided with an overflow opening disposed about its axis, a valve-seat on each side of the overflow opening, and a valve adapted to span the overflow opening and rest upon the valve-seats, substantially as set forth.

5. An injector, having in combination, a lifting cone, a combining cone having at its top a chamber and having overflow passages disposed about its axis, a sleeve projected above the combining cone, said sleeve terminating in a collar at or near its base, and a valve surrounding the sleeve and adapted to rest on the collar and on the outer edge of the combining cone, substantially as shown and described.

6. An injector having lifting, combining and discharging cones, the combining cone being provided at the mouth of the lifting cone with an enlarged cavity or chamber which is larger in diameter than the exterior of the lifting cone, and having overflow openings in its upper side and a sleeve above said openings, in combination with an annular upwardly opening valve slidably mounted upon the said sleeve of the combining cone, and adapted to be actuated by gravity to close said overflow openings in the top of the combining cone, whereby an excess of pressure within the combining cone acts upon the said valve parallel with the direction of its movement to allow escape of fluid through the said overflow openings, substantially as set forth.

7. An injector having in combination, a casing, combining and discharging cones in said casing, said combining cone having at its top a valve seat, and a chamber with overflow openings outside of the contiguous portion of the lifting cone, a sleeve rising from the combining cone and engaging the lower end of the lifting cone, said sleeve having a collar about its bottom portion, provided with a valve seat, and a valve mounted on said sleeve and constructed to seat on said valve seats, substantially as set forth.

8. In an injector, the combination of a casing, the lifting cone having a threaded lower end, the combining cone having a sleeve at its top portion engaged on said threaded lower end, a collar about the bottom of said sleeve provided with a valve seat, said combining cone having also a chamber at its top with overflow openings outside of said sleeve and collar, and a valve seat outside of said openings, and a valve slidably mounted on said sleeve and seated on said valve seats, substantially as set forth.

9. In an injector, the combination of the discharge cone, the combining cone separably connected with the discharge cone and having a chamber at its top with top overflow openings, and a valve seat outside of said openings, a sleeve extending above said chamber and having a collar provided with a valve seat, webbing connecting said collar and sleeve with the wall of the said chamber, and a valve mounted on said sleeve and adapted to seat upon the valve seats, substantially as set forth.

10. The combination with an injector casing having an overflow cavity and provided at one end with a removable cap, of lifting, combining, and discharging cones detachably connected together independently of and seated within the casing, and being held therein by said cap, whereby they may be removed from the casing without disconnection, the upper end of the lifting cone being in communication with a water inlet port, the lower end of the discharge cone being in communication with a discharge port, and the combining cone being provided with valved overflow openings, substantially as set forth.

11. The combination with an injector casing having an overflow cavity, of a cap removably fitted in one end of the casing and provided with an integral nozzle or jet, lifting, combining, and discharging cones detachably connected together independently of and being seated within the casing, and being held therein by said cap which is provided with a flange to bear upon a lateral flange of the lifting cone with said nozzle or jet inserted in the upper end of said cone, whereby the cones may be removed from the casing without disconnection, the upper end of the lifting cone being in communication with a water inlet port, the lower end of the discharging cone being in communication with a discharge port, and the combining cone being provided with valved overflow openings, substantially as set forth.

12. The combination of an injector casing having water inlet and discharge ports and contiguous seats 11 and 30, rigidly connected lifting, combining, and discharging cones, the former being provided with a flange which is fitted upon the seat 11 and the latter of which is provided with a shoulder fitted upon the seat 30, a cap removably fitted in the upper end of the casing and provided with a depending perforated flange to bear upon the flange of the lifting cone, and also provided with a steam jet which is arranged in axial alignment with the connected cones, said combining cone having an enlarged cavity provided with overflow openings communicating with an overflow chamber surrounding the cones, a gravity closed valve arranged to control said overflow openings, and a valved outlet opening at the lower end of the overflow chamber, substantially as set forth.

13. The combination with an injector casing having an overflow chamber provided with a valved outlet, of connected lifting, combining, and discharging cones, arranged in axial alignment with the steam jet and in communication at opposite ends with water inlet and discharge ports, the combining cone being provided with valved overflow openings communicating with the overflow chamber, and the discharging cone being provided with openings in registration with perforations in a reduced lower portion of the combining cone, the reduced lower portion of the combining cone extending below said openings in the discharging cone, substantially as set forth.

14. The combination with an injector casing having an overflow chamber provided with a valved outlet, of connected lifting, combining, and discharging cones arranged in axial alignment with a steam jet and connecting water inlet and discharge ports, the combining cone being provided with valved overflow openings arranged in the upper side of an enlarged cavity of said cone, said cavity being located adjacent to the mouth of the lifting cone, the discharging cone being provided with an enlarged chamber provided in its side walls with outlet openings, and the combining cone being provided with a reduced downwardly tapered portion which extends axially within the enlarged cavity of the discharging cone and is laterally perforated to communicate with the openings in the walls of the discharging cone, substantially as set forth.

15. The combination with an injector casing having an overflow chamber provided at its lower end with an outlet opening, water inlet and discharge ports, an axial steam jet, and connected lifting, combining, and discharging cones, of an overflow nozzle in communication with the outlet opening of the overflow chamber, a valve seated contiguous to and adapted to close said outlet opening and provided with a stem arranged in a suitable guide, a spring for actuating and normally holding the valve seated, and a ring connected to an exposed extended portion of the valve stem and adapted to be engaged with a depression contiguous to the stem to hold the valve in its unseated position, substantially as set forth.

ISAAC R. LAUX.

Witnesses:
HARRY Y. DAVIS,
JAS. L. SKIDMORE.